United States Patent
Kudoh et al.

(10) Patent No.: US 9,407,162 B2
(45) Date of Patent: Aug. 2, 2016

(54) METHOD FOR DESIGNING POWER CONTROLLER, POWER CONTROLLER, AND POWER CONTROL DEVICE

(71) Applicant: Panasonic Corporation, Osaka (JP)

(72) Inventors: Takahiro Kudoh, Kyoto (JP); Tatsuto Kinjo, Osaka (JP); Seiya Miyazaki, Hyogo (JP); Yutaka Yamamoto, Kyoto (JP); Masaaki Nagahara, Kyoto (JP); Naoki Hayashi, Kyoto (JP)

(73) Assignee: PANASONIC CORPORATION, Osaka (JP)

( * ) Notice: Subject to any disclaimer, the term of this patent is extended or adjusted under 35 U.S.C. 154(b) by 42 days.

(21) Appl. No.: 14/401,172

(22) PCT Filed: Apr. 1, 2013

(86) PCT No.: PCT/JP2013/002228
§ 371 (c)(1),
(2) Date: Nov. 14, 2014

(87) PCT Pub. No.: WO2013/175695
PCT Pub. Date: Nov. 28, 2013

(65) Prior Publication Data
US 2015/0131346 A1    May 14, 2015

(30) Foreign Application Priority Data
May 24, 2012    (JP) ................................ 2012-118993

(51) Int. Cl.
*H02M 7/44*    (2006.01)
*H02M 7/5387*    (2007.01)
(Continued)

(52) U.S. Cl.
CPC ............ *H02M 7/44* (2013.01); *H02M 7/53873* (2013.01); *H02M 2001/0012* (2013.01); *H02M 2003/1566* (2013.01)

(58) Field of Classification Search
CPC ........... H02M 7/44; H02M 2001/0012; G05B 19/41865; H01M 10/44; H01M 10/48
See application file for complete search history.

(56) References Cited

U.S. PATENT DOCUMENTS

| | | | |
|---|---|---|---|
| 6,380,715 B1 * | 4/2002 | Kubo | .................... H01M 10/44 320/128 |
| 6,717,381 B2 | 4/2004 | Inagaki et al. | |

(Continued)

FOREIGN PATENT DOCUMENTS

| | | |
|---|---|---|
| JP | 2003-33065 | 1/2003 |
| JP | 2006-146525 | 6/2006 |
| JP | 2008-40664 | 2/2008 |

OTHER PUBLICATIONS

International Search Report issued Jul. 2, 2013 in corresponding International Application No. PCT/JP2013/002228.

(Continued)

*Primary Examiner* — Timothy J Dole
*Assistant Examiner* — Yusef Ahmed
(74) *Attorney, Agent, or Firm* — Wenderoth, Lind & Ponack, L.L.P.

(57) ABSTRACT

A method including: setting a weighting function based on an amount of change in impedance of a control target; and determining, for a power controller, a transfer function composed of a transfer function of an internal model obtainable by performing Laplace transform on the voltage reference value and a transfer function of a partial controller, the transfer function of the partial controller being for outputting the control output after receiving, as an input, an output of the transfer function of the internal model, wherein the determining includes determining the transfer function of the partial controller using an H∞control theory so as to reduce (i) a first amount of control obtainable by multiplying the control output and the weighting function and (ii) a second amount of control that is an output of the transfer function of the internal model.

7 Claims, 13 Drawing Sheets

(51) Int. Cl.
*H02M 1/00* (2006.01)
*H02M 3/156* (2006.01)

(56) References Cited

U.S. PATENT DOCUMENTS

| | | | | |
|---|---|---|---|---|
| 7,145,746 | B1* | 12/2006 | Hirano | G11B 5/59627 360/77.04 |
| 7,233,591 | B2* | 6/2007 | Holtzman | H04W 52/60 370/391 |
| 7,324,024 | B2* | 1/2008 | Fujiyama | G11B 20/10 341/120 |
| 2002/0060545 | A1* | 5/2002 | Inagaki | B60L 11/1807 318/629 |
| 2003/0052633 | A1* | 3/2003 | Inagaki | H02P 25/088 318/432 |
| 2004/0148080 | A1* | 7/2004 | Ekmark | B62D 6/008 701/41 |
| 2005/0002210 | A1* | 1/2005 | Moon | B60L 11/14 363/37 |
| 2005/0031137 | A1* | 2/2005 | Browning | H04R 29/00 381/96 |
| 2005/0077877 | A1* | 4/2005 | Cawthorne | B60W 10/26 320/128 |
| 2007/0067049 | A1* | 3/2007 | Zhou | G05B 5/01 700/28 |
| 2008/0007221 | A1* | 1/2008 | Lee | G01R 31/3648 320/128 |
| 2008/0252259 | A1* | 10/2008 | Suzuki | H02J 7/0047 320/136 |
| 2010/0187907 | A1* | 7/2010 | Toba | H02J 3/32 307/48 |
| 2011/0187198 | A1* | 8/2011 | Williams | H02J 1/12 307/71 |
| 2012/0004806 | A1* | 1/2012 | Hozumi | B60G 17/08 701/37 |
| 2012/0057383 | A1* | 3/2012 | Wei | H02M 7/53871 363/98 |
| 2012/0059544 | A1* | 3/2012 | Kinoshita | B60G 17/0164 701/22 |
| 2013/0082636 | A1* | 4/2013 | Ohori | H02P 4/00 318/723 |
| 2013/0127383 | A1* | 5/2013 | Kawamura | H02P 27/085 318/400.09 |
| 2013/0150993 | A1* | 6/2013 | Miyazaki | H01M 10/44 700/97 |
| 2014/0375128 | A1* | 12/2014 | Vieillard | H02J 1/14 307/34 |
| 2015/0035464 | A1* | 2/2015 | Maekawa | H02M 7/5387 318/400.21 |
| 2015/0070948 | A1* | 3/2015 | Johnson | H02J 3/38 363/41 |
| 2015/0146327 | A1* | 5/2015 | Pfitzer | H02H 3/093 361/18 |
| 2015/0191773 | A1* | 7/2015 | Viovy | G01N 33/48721 435/6.12 |

OTHER PUBLICATIONS

John C. Doyle et al., "State-Space Solutions to Standard $H_2$ and $H_\infty$ Control Problems", IEEE Transactions on Automatic Control, vol. 34, No. 8, pp. 831-847, Aug. 1989.

* cited by examiner

FIG. 11

$$P_{INV} = \frac{1}{T_{INV}*s + 1} \qquad T_{INV} = 0.0005$$

$$P_{filter} = \frac{1}{L*C*s^{\wedge}2 + 1} \qquad \begin{array}{l} L = 1*e(-3)\ [H] \\ C = 15*e(-6)\ [F] \end{array}$$

$$\begin{array}{ll} Z1 = R1 & R1 = 136\ [\Omega] \\ Z2 = R2 + L2*s & R2 = 25.5\ [\Omega],\ 0.216\ [H] \\ Z3 = R3 + L3*s & R3 = 36.4\ [\Omega],\ 0.0973\ [H] \end{array}$$

METHOD FOR DESIGNING POWER CONTROLLER, POWER CONTROLLER, AND POWER CONTROL DEVICE

TECHNICAL FIELD

The present invention relates to a power control device which is used for a power supply device which supplies alternating power to a load device, and relates to a power controller and a method for designing the power controller.

BACKGROUND ART

Recent years have seen widespread use of so-called distribution-type power supply devices such as photovoltaic power generating devices, fuel cells, storage batteries etc. These power supply devices are capable of converting direct current power to alternating current power through power control devices having an inverter, and supplying power as current sources interconnected with commercial use systems.

In addition, some of these power supply devices have independent operation functions for operating as a voltage source similarly to an Uninterruptible Power Supply (UPS). The power supply devices having such independent operation function is capable of supplying power independently from any commercial use system even when power supplied from the commercial use system stops due to a blackout or an accident.

CITATION LIST

Patent Literature

[PTL 1]
Japanese Unexamined Patent Application Publication No. 2006-146525

Non Patent Literature

[NPL 1]
"State-space solutions to standard H2 and H∞ control problems", written by Doyle, John C. and Glover, Keith and Khargonekar, Pramod P. and Francis, and Bruce A., IEEE Transactions on Automatic Control, 1989, vol. 34, No. 8, p. 831-847

SUMMARY OF INVENTION

Technical Problem

In general, an UPS or a distribution-type power supply device is connected to a distribution system that is small compared to a commercial use system and has small impedances of a distribution line and loads connected thereto in an office, a commercial use establishment, an apartment house, a detached house, etc. Here, a distribution system means a system composed of distribution lines in a house such as a detached house and an apartment house or an establishment such as a commercial use establishment etc., and does not mean a distribution network from a distribution point of a so-called power company to power consumers.

For this reason, when a power supply device connected to such a distribution system operates as a voltage source, there is a possibility that a distortion in voltage waveform of an output from the power supply device or a decrease in voltage occurs due to a change in the impedances of devices connected to the power supply device, and the connected devices may not accurately operate.

The present invention was made to solve the above-described problems, and has an object to provide a method for designing a power controller which stably operates as a voltage source even when it is impossible to precisely identify the impedances of the distribution line and loads connected to the power supply device.

Solution to Problem

In order to solve the above-described problems, a power controller designing method according to an aspect of the present invention is for designing a power controller which receives, as an input, a difference between a voltage reference value and an output voltage value output from a control target including an inverter, and outputs, to the control target, a control output for conforming the output voltage value to the voltage reference value, and the power controller designing method includes: setting a weighting function based on an amount of change in impedance of the control target; and determining, for the power controller, a transfer function composed of a transfer function of an internal model obtainable by performing Laplace transform on the voltage reference value and a transfer function of a partial controller, the transfer function of the partial controller being for outputting the control output after receiving, as an input, an output of the transfer function for the internal model, wherein the determining includes determining the transfer function of the partial controller using an H∞ control theory and determining, for the power controller, the transfer function of the partial controller by calculating a product of the transfer function of the partial controller and the transfer function of the internal model, so as to reduce (i) a first amount of control obtainable by multiplying the control output and the weighting function and (ii) a second amount of control that is an output of the transfer function of the internal model.

These general and specific aspects may be implemented in the form of a system, a method, an integrated circuit, a computer program, or a recording medium, or any combination of systems, methods, integrated circuits, computer programs, or recording media.

Advantageous Effects of Invention

The power controller designed using the power controller designing method according to the present invention is capable of outputting a voltage with small distortion and stably operating the load device even when it is impossible to accurately identify the impedances of a distribution line and a load.

BRIEF DESCRIPTION OF DRAWINGS

FIG. 11 is examples of control target model parameters at the time when the power controller for the power control device according to the embodiment is designed.

DESCRIPTION OF EMBODIMENTS (Underlying Knowledge Forming Basis of the Present) Disclosure When a power supply device connected to a distribution system smaller than a commercial use system operates as a voltage source, a distortion occurs in the voltage waveform of an output from the power supply device and a voltage decreases due to changes in the impedances of devices connected to the power supply device. The distortion in the voltage waveform and decrease in the voltage may cause a problem that any of the devices connected to the power supply device may not operate normally.

Figure 1:
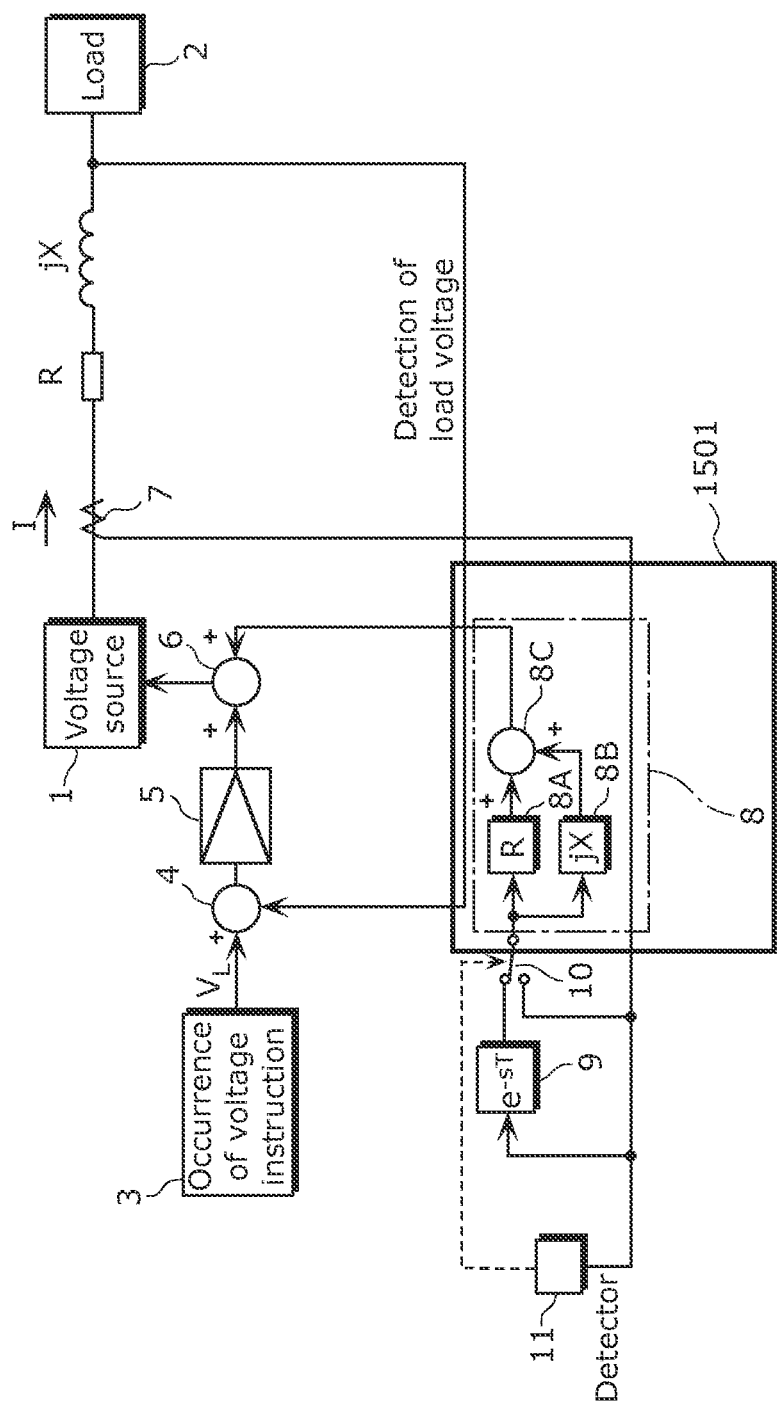
FIG. 1 is a diagram illustrating a control block of a conventional power control device.

In view of the problem, Patent Literature 1 discloses a technique for controlling an inverter device illustrated in FIG. 1. A voltage change compensating block 1501 illustrated in the diagram feeds back a current value obtainable from a current sensor 7 to a controller which controls a voltage source 1. In this way, the voltage change compensating block 1501 compensates a voltage by the amount of change in voltage due to the impedances of a distribution line and load devices connected to the inverter device. According to the control technique, it is possible to calculate the amount of decrease in voltage based on the impedances and current values of the distribution line and load devices, and prevent the voltage from decreasing by adding the calculated amount of decrease to a voltage instruction value based on the load voltage detection.

In this control technique, there is a need to set impedance values for the distribution line and loads in a control block. For this reason, there is a need to accurately calculate the impedances of the distribution line and loads at the time of designing the controller. However, it is difficult to know in advance the impedance of the distribution line of a system to which the power supply device is connected, and to identify loads to be connected to the power supply device. For this reason, it is impossible to set accurate impedance values to the control block, and thus cannot completely compensate a decreased voltage.

In addition, Patent Literature 1 describes that a change and an error in impedance can be corrected using a feedback method. However, based on the internal model principle, the use of only the feedback method is insufficient for such correction. In other words, in order that the power supply device outputs a voltage of a sine wave, the control block needs to have a transfer function including a term of $(S^2+\omega^2)$ in the denominator obtained by performing Laplace transform on a sine wave so that trackability is compensated.

Furthermore, with the mere feedback structure as in Patent Literature 1, it is impossible to ensure robust stability to a modeling error (an unconceivable change or error in impedance) and a disturbance. Accordingly, when a rectifier load or the like is connected to the power supply device, a voltage waveform with a superimposed distortion due to a harmonic current is to be generated.

In this way, when an output voltage of the power supply device has a voltage decrease and a harmonic distortion, the load device may not operate normally. In addition, the voltage decrease and harmonic distortion in the output voltage of the power supply device may cause an overheat and a breakdown of the load device.

The present invention was made to solve problems like this, and can be implemented as a power controller for a power supply device providing robust stability and trackability even when it is impossible to accurately identify impedances of the distribution line and the load which are connected.

In order to solve the above-described problems, a power controller designing method according to an aspect of the present invention is for designing a power controller which receives, as an input, a difference between a voltage reference value and an output voltage value output from a control target including an inverter, and outputs, to the control target, a control output for conforming the output voltage value to the voltage reference value, and the power controller designing method includes: setting a weighting function based on an amount of change in impedance of the control target; and determining, for the power controller, a transfer function composed of a transfer function of an internal model obtainable by performing Laplace transform on the voltage reference value and a transfer function of a partial controller, the transfer function of the partial controller being for outputting the control output after receiving, as an input, an output of the transfer function for the internal model, wherein the determining includes determining the transfer function of the partial controller using an H∞control theory and determining, for the power controller, the transfer function of the partial controller by calculating a product of the transfer function of the partial controller and the transfer function of the internal model, so as to reduce (i) a first amount of control obtainable by multiplying the control output and the weighting function and (ii) a second amount of control that is an output of the transfer function of the internal model.

According to the power controller designing method, it is possible to provide the power controller capable of ensuring robust stability and increasing load trackability to impedance changes and outputting a voltage with little distortion even when it is impossible to identify the impedances of the distribution line and the load. In other words, the power supply device using the power controller is capable of stably operating the load device.

In addition, the voltage reference value may be represented as a sin function, and the transfer function of the internal model may be obtainable by performing Laplace transform on the sin function.

In this way, with the term of $(S^2+\omega^2)$ in the denominator, the transfer function of the internal model has an increased output voltage trackability based on the internal model principle.

In addition, the control target may include at least one of a filter, a distribution line, or a load device connected to an output of the inverter.

In addition, in the setting, the weighting function may be set based on the amount of change, the amount of change being a difference between a minimum impedance conceivable for the control target and a maximum impedance conceivable for the control target.

Furthermore, the control target may include a filter, a distribution line, and a load device which are connected to an output of the inverter, and in the setting, when impedances of the filter and the distribution line which are connected to the output of the inverter are determined to be nominal models, the weighting function may be set based on the amount of change, the amount of change being a difference between a combined impedance of the nominal models and a maximum combined impedance of the filter, the distribution line, and the load device which are connected to the output of the inverter.

In addition, a power controller according to an aspect of the present invention includes: a matrix storage unit configured to store a coefficient matrix for representing, as a state space, a transfer function for the power controller determined using the power controller designing method; a state storage unit for storing a vector representing an internal state in the state space; and an operating unit configured to calculate the control output based on a difference between the voltage reference value and the output voltage value, the vector representing the internal state stored in the state storage unit, and the coefficient matrix.

With the power controller, it is possible to ensure robust stability and increase load trackability to impedance changes and outputting a voltage with little distortion even when it is impossible to identify the impedances of the distribution line and the load. In other words, the power supply device using the power controller is capable of stably operating the load device.

In addition, the power controller may have gain frequency characteristics including: a gain shown in an upward convex in a graph in a frequency band of the voltage reference value; and a gain at or below 0 decibel in a frequency band in which impedances of the distribution line and the load device connected to the power controller change.

In addition, the power controller may have gain frequency characteristics that a gain is at or below 0 decibel and is shown as a downward convex in a resonant frequency band of an LC filter included in the control target.

Furthermore, a power control apparatus according to an aspect of the present invention includes: the power controller; and an inverter which is controlled by the control output by the power controller.

According to the power controlling device, it is possible to ensure robust stability and increase load trackability to impedance changes and outputting a voltage with little distortion even when it is impossible to identify the impedances of the distribution line and the load, and thus to cause the load device to operate stably.

In addition, the present invention may be implemented as a program, and/or a computer-readable recording media having the program recorded thereon.

Hereinafter, an embodiment is described with reference to the drawings.

Each of the exemplary embodiments described below shows a general or specific example. The numerical values, elements, the arrangement and connection of the elements, steps, the processing order of the steps etc. shown in the following exemplary embodiment are mere examples, and therefore do not limit the present invention. Therefore, among the elements in the following exemplary embodiment, elements not recited in any one of the independent claims which define the most generic concept are described as arbitrary elements.

[Description of Embodiment]

Figure 2:
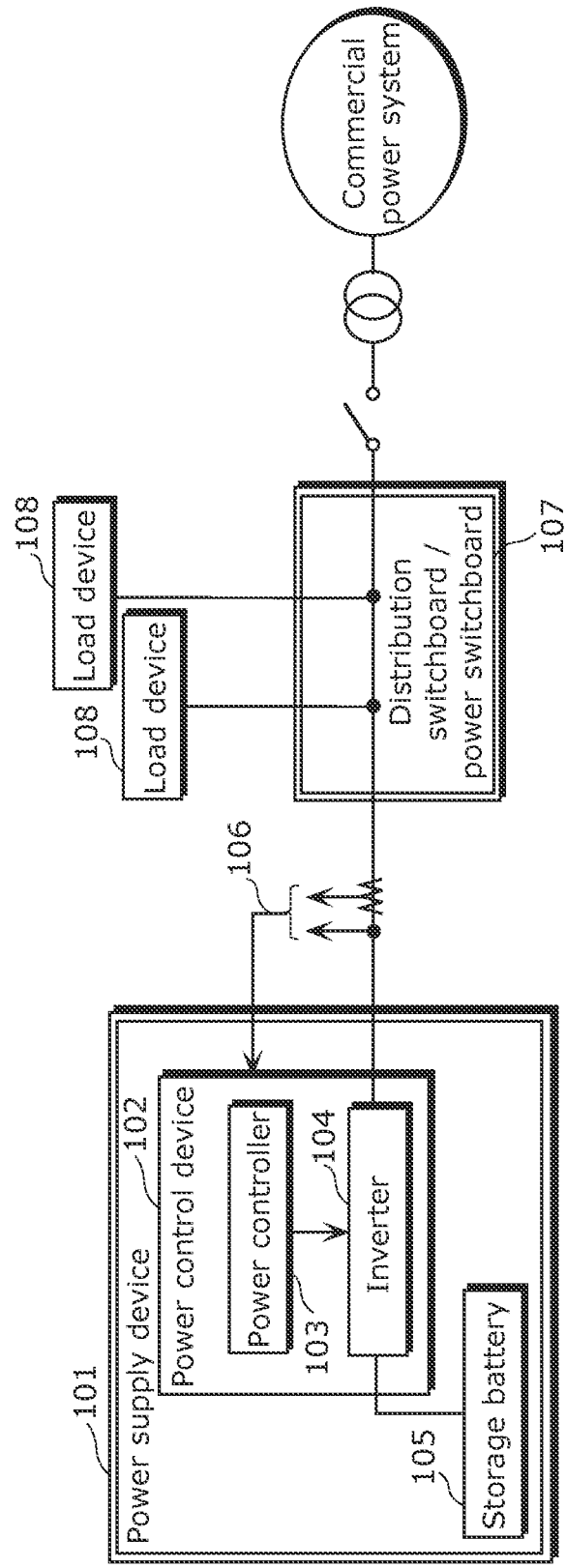
FIG. 2 is a diagram illustrating an entire system configuration of a power supply device including a power control device according to an embodiment.

FIG. 2 is a diagram illustrating an entire system configuration of a power supply device including a power control device according to an embodiment.

As shown in FIG. 2, the power supply device 101 according to this embodiment includes: a storage battery 105 as a direct current power source and a power control device 102.

The storage battery 105 is a secondary battery. The storage battery 105 is a lithium ion battery, a lead battery, a redox flow battery, or the like, as a non-limiting example.

The power control device 102 converts direct current power output from the storage battery 105 to alternating current power. The power control device 102 is connected to a distribution switchboard/power switchboard 107, and the distribution switchboard/power switchboard 107 is further connected to a load device 108. The alternating current power output by the power control device 102 is supplied to the load device 108 via the distribution switchboard/power switchboard 107.

Next, the power control device 102 is described in detail.

The power control device 102 is composed of the power controller 103 and the inverter 104.

The power controller 103 controls the inverter 104 by outputting a control output u, based on an output voltage value and an output current value of the power supply device 101 which are detected by the voltage/current sensor 106. For example, the power controller 103 controls the inverter 104 by the control output u using a pulse width modulation.

The inverter 104 converts the direct current power from the storage battery 105 to alternating current power based on the control output u from the power controller 103, and outputs the alternating current power.

The voltage value and current value of the power supply device 101 change depending on the kind and number of load devices 108 which are connected thereto. For this reason, the power controller 103 controls the inverter 104 so that an expected voltage waveform is output from the power supply device 101 while measuring the output voltage and output current from the power supply device 101.

Next, the functional structure of the power control device 102 is described in detail with reference to FIG. 3.

Figure 3:
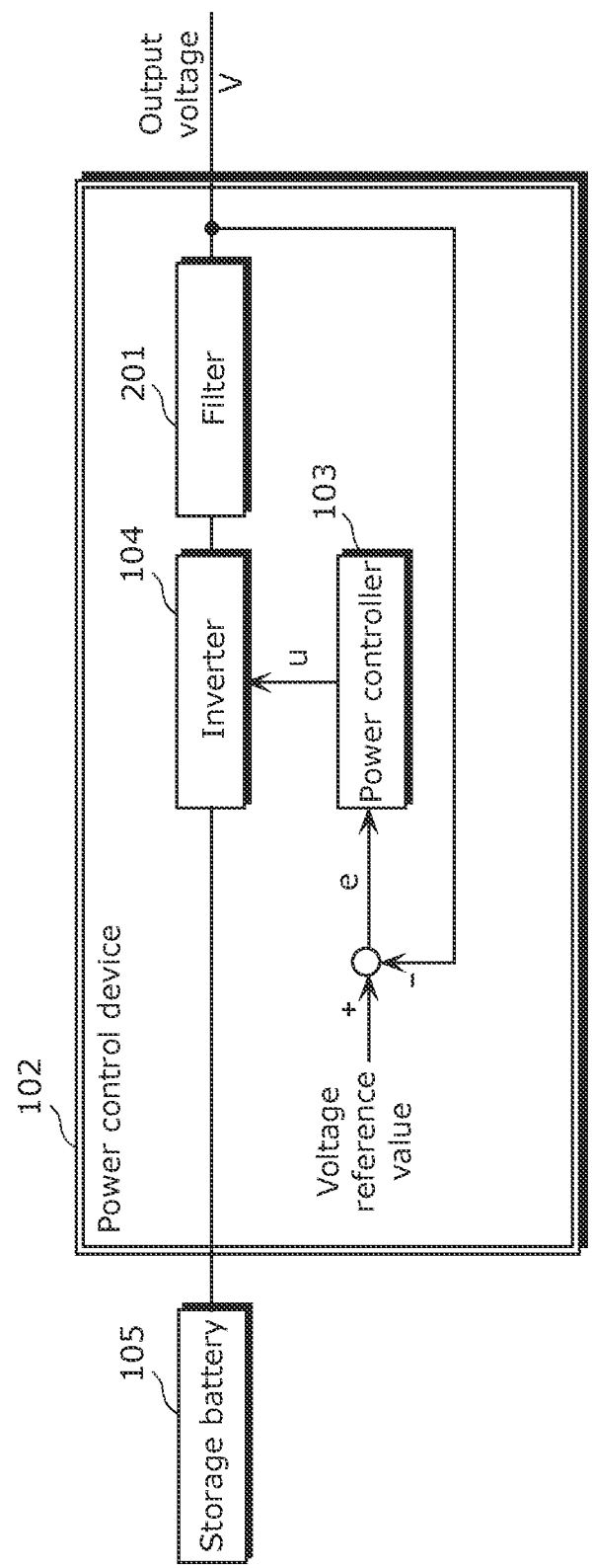
FIG. 3 is a block diagram illustrating a functional structure of the power control device according to the embodiment.

FIG. 3 is a block diagram illustrating the functional structure of the power control device 102.

As shown in FIG. 3, the power control device 102 includes: the power controller 103; the inverter 104 connected to the storage battery 105; and the filter 201.

The inverter 104 outputs power to the distribution system via the filter 201, based on the control output u of the power controller 103. At this time, the inverter 104 operates such that a momentary voltage at the time of output to the distribution system matches (conforms to) a voltage reference value which is given as an instruction from the power controller 103. The inverter 104 includes four switching elements which are formed by full bride connection and each of which includes diodes connected in parallel in a reversed direction. Here, the inverter 104 is not limited to be the inverter configured in this way. In other words, the inverter 104 may be configured differently.

When power is output from the inverter 104, the power changes a voltage of a direct current line through which the inverter 104 and the storage battery 105 are connected. The power output from the inverter 104 takes a value that may be positive or negative.

A case where the power output from the inverter 104 is a positive value indicates that the inverter 104 discharges power to a distribution line. In this case, the voltage value of the direct current line decreases, and thus the storage battery 105 discharges power to compensate power corresponding to the decrease.

In addition, a case where the power to be output from the inverter 104 has a negative value indicates that power is charged from the distribution line to the inverter 104. In this case, the voltage value of the direct current line increases, and thus the storage battery 105 charges power to compensate power corresponding to the increase.

The filter 201 is mounted between the inverter 104 and the distribution line, and has a function for removing harmonic components of a voltage to be output from the inverter 104. The filter 201 is normally composed of a reactor and a capacitor, and has properties of inductance, capacitance, etc. In addition, the filter 201 may have a structure having a resistor.

When a difference between a voltage reference value Vref and an output voltage V is input, the power controller 103 calculates a control output u, and outputs the control output u to the inverter 104. In other words, the power controller 103 has a feedback loop for obtaining an output of the inverter 104 through the filter 201.

More specifically, a signal e to be input to the power controller 103 is described according to Expression (1) below.
[Math. 1]

$$e = \text{voltage reference value Vref} - \text{output voltage value V} \quad \text{Expression (1)}$$

With the feedback loop, an output voltage value to be output from the inverter 104 through the filter 201 is controlled to follow a voltage reference value.

Figure 4:
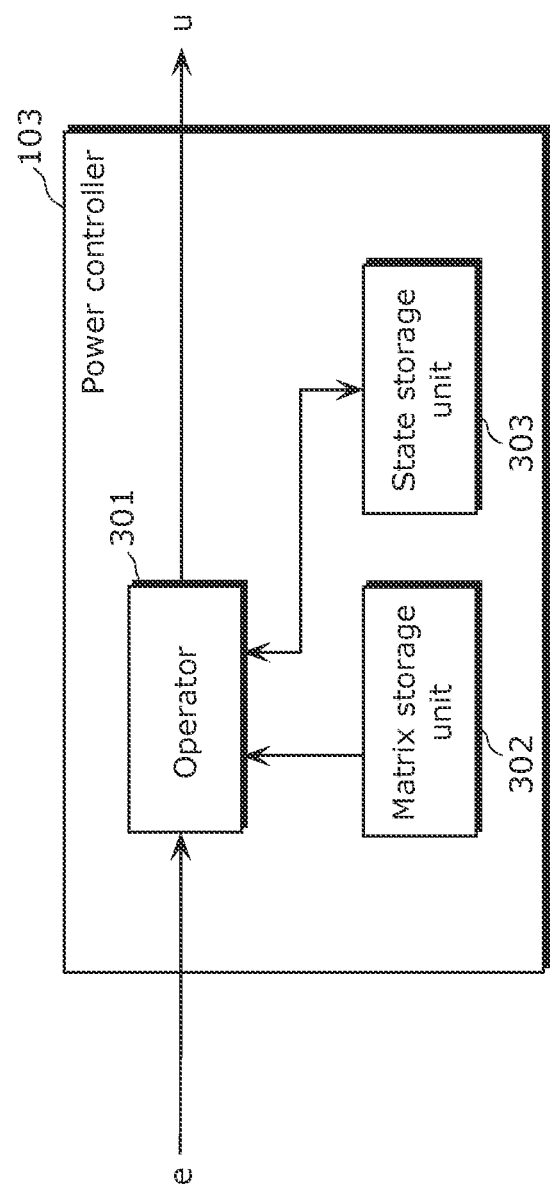
FIG. 4 is a block diagram illustrating a functional structure of a power controller according to the embodiment.

Next, with reference to FIG. 4, a structure of the power controller 103 is described in detail.

FIG. 4 is a block diagram illustrating the functional structure of the power controller 103.

As shown in FIG. 4, the power controller 103 includes: an operating unit 301; a matrix storage unit 302; and a state storage unit 303.

The matrix storage unit 302 stores a coefficient matrix for representing, as a state space, a transfer function determined according to a method of designing the power controller 103 according to this embodiment. The matrix storage unit 302 is, specifically, a Random Access Memory (RAM), a Read Only Memory (ROM), a Static Random Access Memory (SRAM), or the like. It is to be noted that a method for determining a coefficient matrix is described later.

The state storage unit 303 is a storage unit for storing a vector indicating an internal state in a state space. The state storage unit 303 is, specifically, a RAM or the like. It is to be noted that a specific example of a vector indicating an internal state is described later.

The operating unit 301 calculates a control output u, based on (i) a signal e which is a difference between a control target value (a voltage reference value) input to the power controller 103 and an output voltage value output by the inverter 104 through the filter 201, (ii) a vector x representing an internal state stored in the state storage unit 303, and a coefficient matrix stored in the matrix storage unit 302.

More specifically, the operating unit 301 multiplies a first coefficient matrix $A_K$ stored in the matrix storage unit 302 and a vector x [n] representing an internal state in a certain point of time n (n is an integer).

Next, the operating unit 301 multiplies a second coefficient matrix $B_K$ stored in the matrix storage unit 302 and a signal e [n] obtained by the power controller 103 in a certain point of time n.

Next, the operating unit 301 calculates a vector x [n+1] indicating an internal state in a point of time next to n (that is, n+1 point of time), by adding these two multiplication results. In other words, the vector x [n+1] indicating the internal state is represented according to Expression (2) below.
[Math. 2]

$$x[n+1] = Ax[n] + Be[n] \quad \text{Expression (2)}$$

Next, the operating unit 301 calculates a control output u [n] at an n point of time, by multiplying a third coefficient matrix $C_K$ stored in the matrix storage unit 302 and a vector x [n] representing an internal state at the n point of time. In other words, the control output u [n] is represented according to Expression (3) below.
[Math. 3]

$$u[n] = Cx[n] \quad \text{Expression (3)}$$

It is to be noted that coefficient matrices $A_K$, $B_K$, and $C_K$ are calculated as shown in Non-patent Literature 1.

Figure 5:
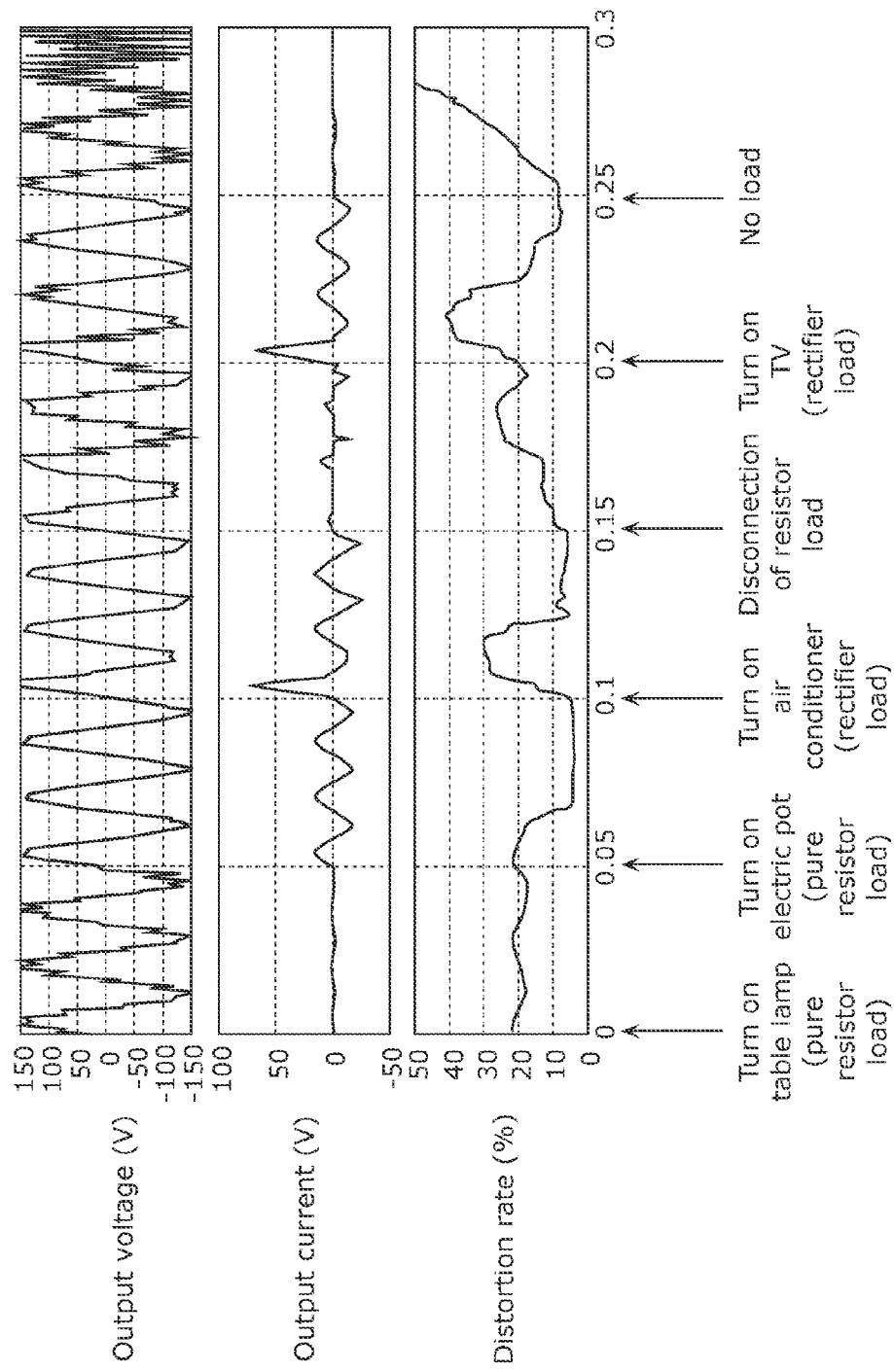
FIG. 5 is a diagram illustrating an example of the waveform of a current which is consumed by load devices.

Next, FIG. 5 illustrates waveforms of a voltage and a current at the time when a rectifier load or a pure resistor load is connected as a load device 108 to a stand-alone outlet of a photovoltaic power generating device on the market.

FIG. 5 is a current waveform at the time when a rectifier load or the like is connected as the load device 108.

As shown in FIG. 5, the current waveform becomes non-linear according to changes in the load, which produces distortion in the voltage waveform.

It is concerned that the distortion in the voltage waveform places various kinds of influence on the load device. For example, when the load device 108 is a device such as a washing machine having an induction motor load, the distortion in the voltage waveform causes a change in the number of turns or overheat. In addition, when the load device 108 is a device having a rectifier load such as a television receiver, the distortion in the voltage waveform causes a flicker in a video or a malfunction of a device. In addition, when the load device 108 is a fluorescent lamp, a distortion in the voltage waveform may cause a burnout in a ballast or a burnout in a capacitor. For this reason, the power controller 103 in the inverter 104 in the power supply device 101 is desired to have a robust stability. Here, the robust stability means that it is possible to output a voltage waveform having a small distortion when it is unclear that the inverter 104 does not have impedances of the distribution line and the load, or even when the impedances change.

In view of this, a description is given of a method for designing the power controller 103 which is robust to a change in impedance and is capable of increasing trackability to a voltage reference value Vref provided as a sine wave. More specifically, an H∞controller is used as a model for the power controller 103. The H∞controller constitutes the related art to the present invention capable of balancing a target trackability and robustness. The following description explains a method for determining various kinds of parameters that are necessary at the time when the H∞controller is mounted, as a method for designing the power controller 103.

Figure 6:
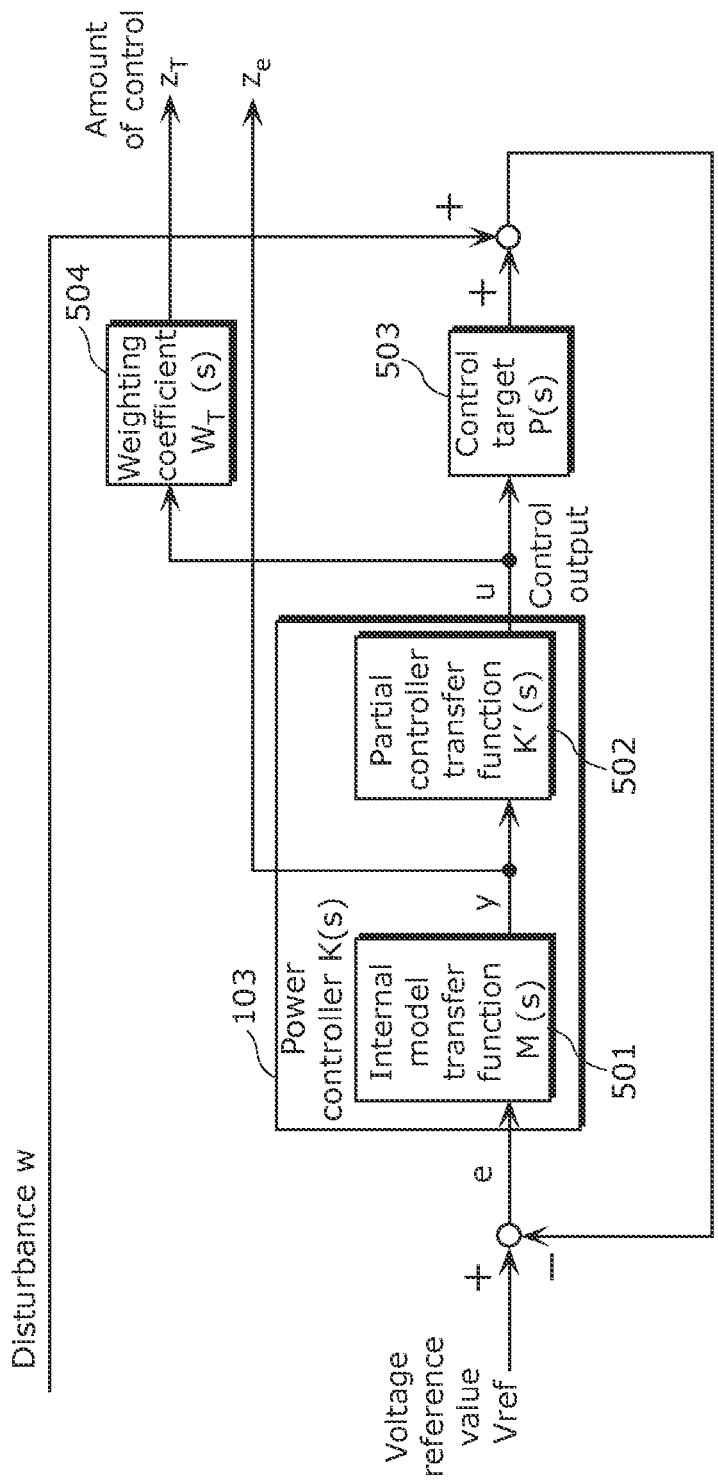
FIG. 6 is a block diagram illustrating a structure of a model of a power control device which is used when a power controller is designed as an H∞controller.

FIG. 6 is a block diagram illustrating a structure of a model of a power control device 102 which is used when the power controller 103 is designed as the H∞controller.

Here, K (s) denotes a transfer function of the power controller 103 included in the power control device 102 illustrated in FIG. 3. More specifically, the K (s) corresponds to a model representing a dynamic characteristic of the power controller 103. The K (s) is composed of a transfer function M (s) of an internal model 501 and a transfer function K' (s) of a partial controller 502. The K (s) is designed by appropriately determining parameters included in a transfer function P (s) of a control target 503 and a weighting function 504 $W_T$(s).

First, the internal model 501 is described.

According to an internal model principle, in a servo problem in which an output of a control target is caused to track a target value, an open loop transfer function composed of a controller and a control target needs to have the same polarity with a target generator.

In this embodiment, the target value is a sine wave (sin function) of 60 Hz or 50 Hz which is a voltage reference value Vref (in the following descriptions in this embodiment, the frequency of the voltage reference value is assumed to be 60 Hz). Accordingly, the open loop transfer function needs to include a denominator having a term of $S^2+\omega^2$ which is a Laplace transform of the sin function. The transfer function M (s) of the internal model 501 is a transfer function indulging a denominator having a term of $S^2+\omega^2$, and is represented as, for example, Expression (4) below.

[Math. 4]

$$M(s)=k1/(s^2+\omega^2) \quad \text{Expression (4)}$$

Here, ω is an angular frequency which is given as 2*n*frequency.

Here, k1 is a coefficient which is set at the time of design, and s is a variable in Laplace transform. It is to be noted that Expression (4) has a form obtained by performing constant multiplication on Laplace-transformed sin function. Likewise, an expression having a form obtained by performing constant multiplication on Laplace-transformed cos function is also possible. In other words, M (s) may be a transfer function obtained by multiplying a term of s with a denomination of Expression (4).

The transfer function K' (s) of the partial controller 502 is a communication function which is derived according to the H∞control theory to be described later. The method for determining a transfer function of the partial controller 502 is described in detail later.

P (s) is a transfer function of the control target 503.

Figure 7:
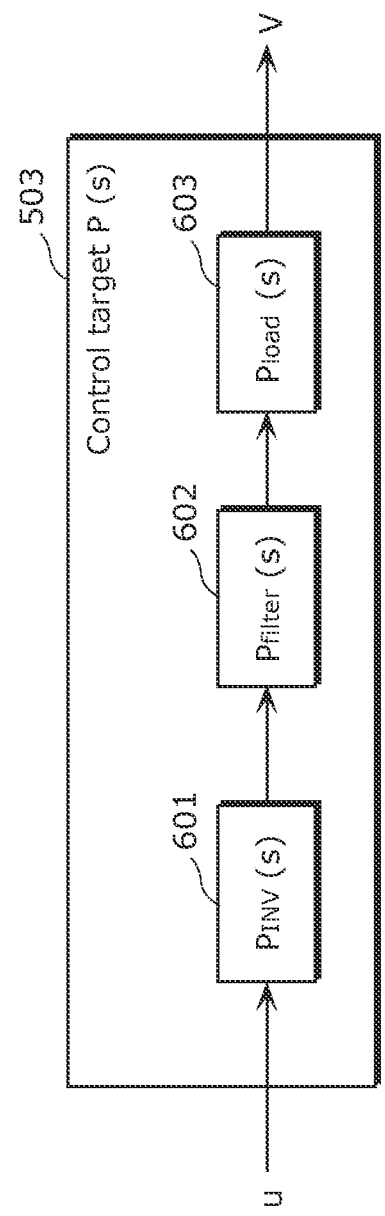
FIG. 7 is a block diagram of targets which are controlled by the power control device according to the embodiment.

FIG. 7 is a block diagram representing details of the transfer function P (s) of the control target 503. The transfer function P (s) of the control target 503 is composed of an inverter block 601, a filter block 602, and a load device block 603.

The inverter block 601 is a transfer function representing a dynamic characteristic of the inverter 104 in FIG. 3.

The filter block 602 is a transfer function representing a dynamic characteristic of the filter 201 in FIG. 3.

The load device block 603 is a transfer function representing an impedance of the load device 108 in FIG. 2.

The inverter block 601 and the filter block 602 are respectively represented as, for example, a first and second order lag systems in Expressions (5) and (6).

[Math. 5]

$$P_{INV}(s)=1/(T_{INV}*s+1) \quad \text{Expression (5)}$$

[Math. 6]

$$P_{filter}(s)=1/(L*C*s^2+1) \quad \text{Expression (6)}$$

Here, $T_{INV}$ denotes a time constant of the inverter 104, L denotes an inductance component of the filter 201, and C denotes a conductance component of the filter 201.

Next, a description is given of a method for representing the load device 108 as the load device block 603 according to a transfer function representation.

Figure 8:
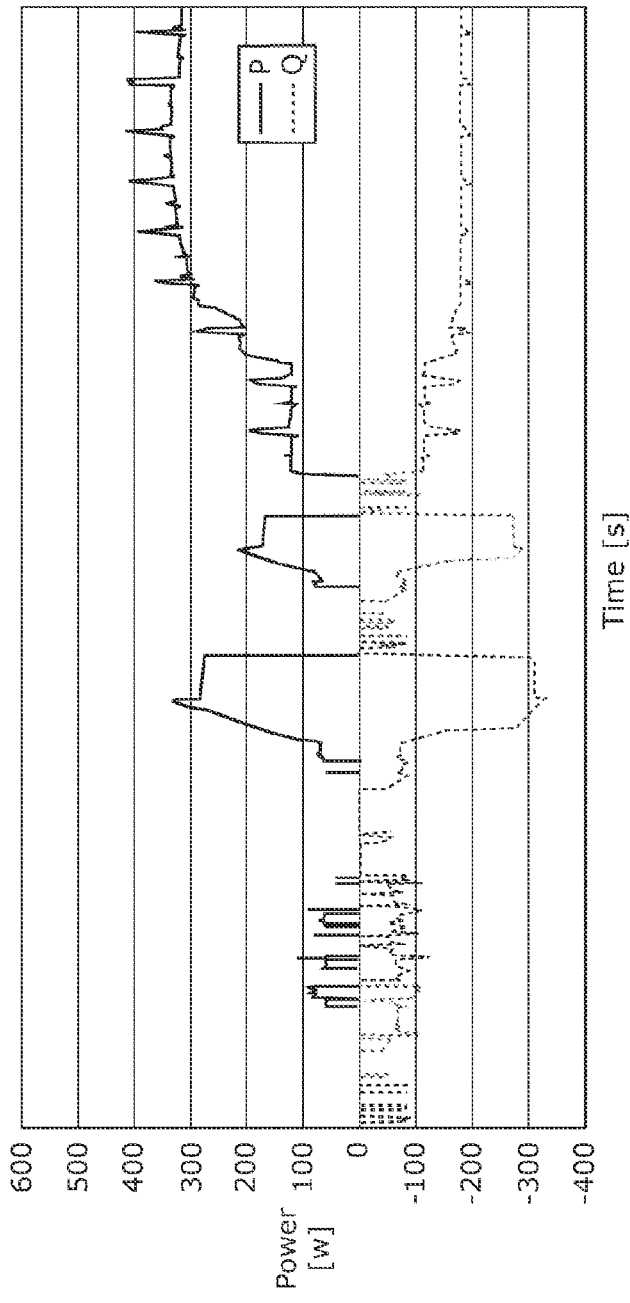
FIG. 8 is a diagram illustrating an example of valid power which is consumed by the load devices and invalid power.

FIG. 8 illustrates examples of valid power P and invalid power Q at the time when the load device 108 is actually operated. In the diagram, the valid power P reaches a maximum value when P is 280 [W], and Q is 310 [Var]. Expression (7) represents a relationship between P and an output voltage V and a resistance R, and Expression (8) represents a relationship between Q and an inductive reactance X.

[Math. 7]

$$P=V^2/R \quad \text{Expression (7)}$$

[Math. 8]

$$Q=V^2/X \quad \text{Expression (8)}$$

When the output voltage V is set to 101 [V], and the value of Q is substituted, R and X are calculated respectively as 36.43 and 32.91. In addition, when 2*n*60 Hz is substituted as an angular frequency ω in Expression (9) which is the relational expression of R, X, and an impedance Z, a result of the impedance Z=36.43+0.0873 s is obtained.

[Math. 9]

$$Z=R+s*X/\omega \quad \text{Expression (9)}$$

In addition, in FIG. 6, w denotes a disturbance, and an input of the power controller 103 which becomes a model as the H∞controller is denoted as e. Here, e is an error between a voltage reference value Vref and an output voltage V which is represented as a sum of an output of the control target 503 and a disturbance w. When the error e is input to the power controller 103, the power controller 103 outputs a control output u, and thereby realizes a feedback structure to a target value input.

In addition, in FIG. 6, an input y with respect to a transfer function K' (s) of the partial controller 502 which is the H∞controller is defined as the amount of control Ze (a second amount of control).

Likewise, in FIG. 6, a value obtained by multiplying a weighting function 504 $W_T$ (s) with a control output u is defined as the amount of control $Z_T$ (a first amount of control).

The weighting function 504 is represented as a transfer function $W_T$(s). By providing the characteristic of the weighting function 504 $W_T$ (s) in a frequency area, it is possible to change the characteristic of the power controller 103. More specifically, by designing the weighting function 504 $W_T$ (s) to have a large gain in a frequency area in which the amount of control is desired to be small, it is possible to provide a desirable characteristic to the power controller 103. It is to be noted that the amounts of control $Z_T$ and Ze, and the weighting function 504 $W_T$ (s) are described later in detail.

Next, the method for designing the partial controller that is the H∞controller is described with reference to FIG. 9.

Figure 9:
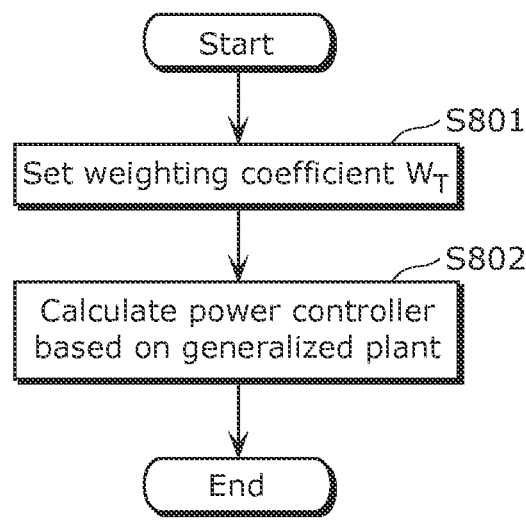
FIG. 9 is a flowchart of a method for designing the power controller according to the embodiment.

FIG. 9 is a flowchart of a method for designing the power controller 103 according to this embodiment.

As described above, the power controller 103 is modeled as a product of a transfer function M (s) of the internal model 501 for a voltage reference value and a transfer function K' (s) of the partial controller 502 that is the H∞controller.

Here, the H∞control theory is a control theory for configuring a control system for suppressing influences of a disturbance signal and a modeling error. More specifically, a transfer function is evaluated by a scalar value called an H∞norm which becomes an indicator for control. By determining a transfer function that makes the H∞norm smaller than a desired value, a target performance is achieved.

More specifically, a designing procedure taken here is to reduce the H∞norm of the transfer function from the disturbance signal is input to an evaluation result is output, for a general-purpose target control model called a generalized plant. By assuming an uncertain part of the control target as a modeling error and designing the transfer function from the input to the output of the disturbance signal to have a small H∞norm, the resulting control system becomes a control system which suppresses the influences of the uncertainty of the model and the disturbances.

Here, a characteristic which is valid and stable to an error from an assumed control target model (which is an ideal model without any change and error, and is hereinafter referred to as a nominal model) is referred to as robustness. When a control system is designed, a control target model is required. However, it is difficult to obtain a precise control target model in many cases, and some error is inevitably occurs between a prepared model and an actual control target. The robust control is a control system designing method for designing a control system that is robust in terms of maintaining stability to such error. With the robustness, the H∞control has an advantage of eliminating the need to prepare a precise control target model.

In the earlier described designing of the H∞controller, specifications of the amounts of control $Z_T$ and Ze are determined in advance based on the control model illustrated in FIG. 6. The specifications of the amounts of control $Z_T$ and Ze are, for example, threshold values corresponding to upper limits for the amounts of control $Z_T$ and Ze. In addition, the threshold values corresponding to upper limits and lower limits may be determined as specifications.

In general, both of the amounts of control $Z_T$ and Ze are preferably close to 0. However, in the case of actually determining a gain for the H∞controller, it is difficult to completely reduce the amounts of control $Z_T$ and Ze to 0. Accordingly, there is a need to determine a smaller threshold value for the amount of control that should be preferentially made smaller according to the specifications of the power controller 103 that are determined by characteristics of the power supply device 101 that is the target system.

For example, in the case where assumed noise includes many high-frequency band components, a threshold value for the amount of control Z is preferentially made smaller in the high-frequency band. In the opposite case where assumed noise includes many low-frequency band components, a threshold value for the amount of control Z is preferentially made smaller in the low-frequency band.

First, the weighting function 504 $W_T$(s) is set based on the specifications (S801 in FIG. 9).

The weighting function 504 $W_T$ (s) has an effect of suppressing influences on the modeling error. For this reason, by appropriately setting the weighting function 504 $W_T$(s), it is possible to increase the robustness of the power controller 103. More specifically, it is possible to realize robust control performances to a change in impedance that depends on the kind of the load device 108 connected to the distribution line, or that is caused by activation/stoppage or the like of the load device 108.

Here, the method for designing the weighting function 504 $W_T$(s) is described in detail. Now, loads having three kinds of impedances are assumed as examples of loads connected to the distribution line, as represented by Expressions (10) to (12) below. It is to be noted that the method for calculating negative impedances is performed using actually measured values, as illustrated with reference to FIG. 8.

[Math. 10]

$$Z1=R1 \qquad \text{Expression (10)}$$

[Math. 11]

$$Z2=R2+L2*s \qquad \text{Expression (11)}$$

[Math. 12]

$$Z3=R3+L3*s \qquad \text{Expression (12)}$$

Here, Z1 is a pure resistor load such as a table lamp (lighting equipment). The inverter distribution lines Z2 and Z3 are, for example, rectifier loads such as a television receiver and an air conditioner.

The weighting function 504 $W_T$ (s) is set to suppress the influence of the modeling error of the control target. As described above, the control target is represented by a product of the inverter block 601, the filter block 602, and the load device block 603 which are structural elements illustrated in FIG. 7.

Here, as an example, assuming that the inverter block 601 and the filter block 602 do not have any modeling error, changes in impedance caused by activation/stoppage or the like of the loads represented by Expressions (10) to (12) are handled as modeling errors.

First, a control target P (s) in FIG. 7 is assumed to be a control target nominal model at the time when only a load Z1 is connected. In other words, P (s) is represented as Expression (13).

[Math. 13]

$$P(s)=P_{INV}(s)*P_{filter}(s)*Z1 \qquad \text{Expression (13)}$$

In addition, a combined impedance Za when all of the loads in Expression (10) to (12) are connected is represented as in Expression (14) below, and thus is provided as the weighting function 504 $W_T$ (s) according to Expression (15).

[Math. 14]

$$Za=1(1/Z1+1/Z2+1/Z3) \qquad \text{Expression (14)}$$

[Math. 15]

$$WT(s)=P_{INV}(s)*P_{filter}(s)*(Za-Z1) \qquad \text{Expression (15)}$$

Expression (15) represents a variation in impedance from the nominal model with a combination of loads Z1, Z2, and Z3 when the load in an ideal nominal model without any change and error is assumed to be Z1. In other words, by setting the weighting function 504 $W_T$ (s) in this way, it is possible to design the power controller 103 with a robust stability in a conceivable impedance change range.

Figure 10:
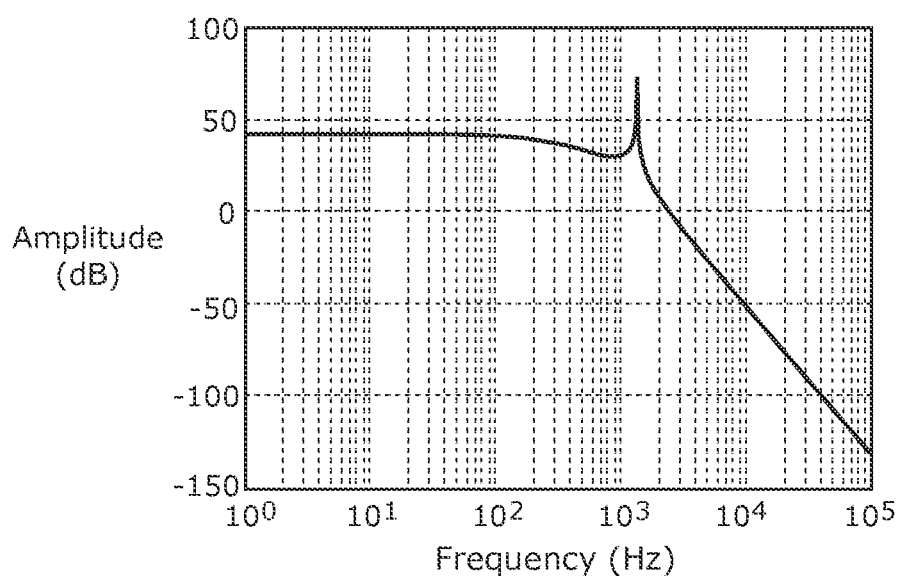
FIG. 10 is a Bode diagram of a weighting function $W_T(s)$ according to the embodiment.

FIG. 10 illustrates the Bode diagram of the weighting function 504 $W_T$ (s) set in this way.

As illustrated in FIG. 10, the gain of the weighting function 504 $W_T$ (s) increases (takes a largest value) around a frequency of 1000 Hz. This is because an LC filter is included in a transfer function of the weighting function 504 $W_T$ (s), and a resonance frequency of an LC filter is 1000 Hz in this embodiment.

In other words, with these characteristics of the weighting function 504, the partial controller 502 derived according to the H∞control theory is to have a characteristic of having a low gain in the resonance frequency of the LC filter included in the control target. In this way, it is possible to prevent the partial controller 502 from operating unstably at the resonance frequency of the LC filter.

In addition, FIG. 10 illustrates the gain of the weighting function 504 $W_T$ (s) is set to be high at a low frequency area. This means that the impedance changes significantly at the low frequency area. In this way, it is possible to increase the robustness of the partial controller 502 at the low frequency area.

FIG. 11 illustrates examples of various kinds of parameters and transfer functions illustrated in this embodiment.

Although the impedance of only the load device 108 is described as the target in this embodiment, the impedance of the distribution line may further be considered. In this embodiment, a conceivable impedance change range is set for each of three loads represented by Expressions (10) to (12). However, without being limited thereto, an impedance range may be determined for another load device which may be connected, or for the load device 108 which should perform motion compensation. In this way, it is possible to compensate the robustness of the power controller 103 within the change range.

Lastly, based on a generalized plant, the method for solving the H∞control problem is applied to derive a transfer function K' (s) of the partial controller 502, and calculate the power controller 103 together with the internal model 501 described above (S802 in FIG. 9).

Figure 12:
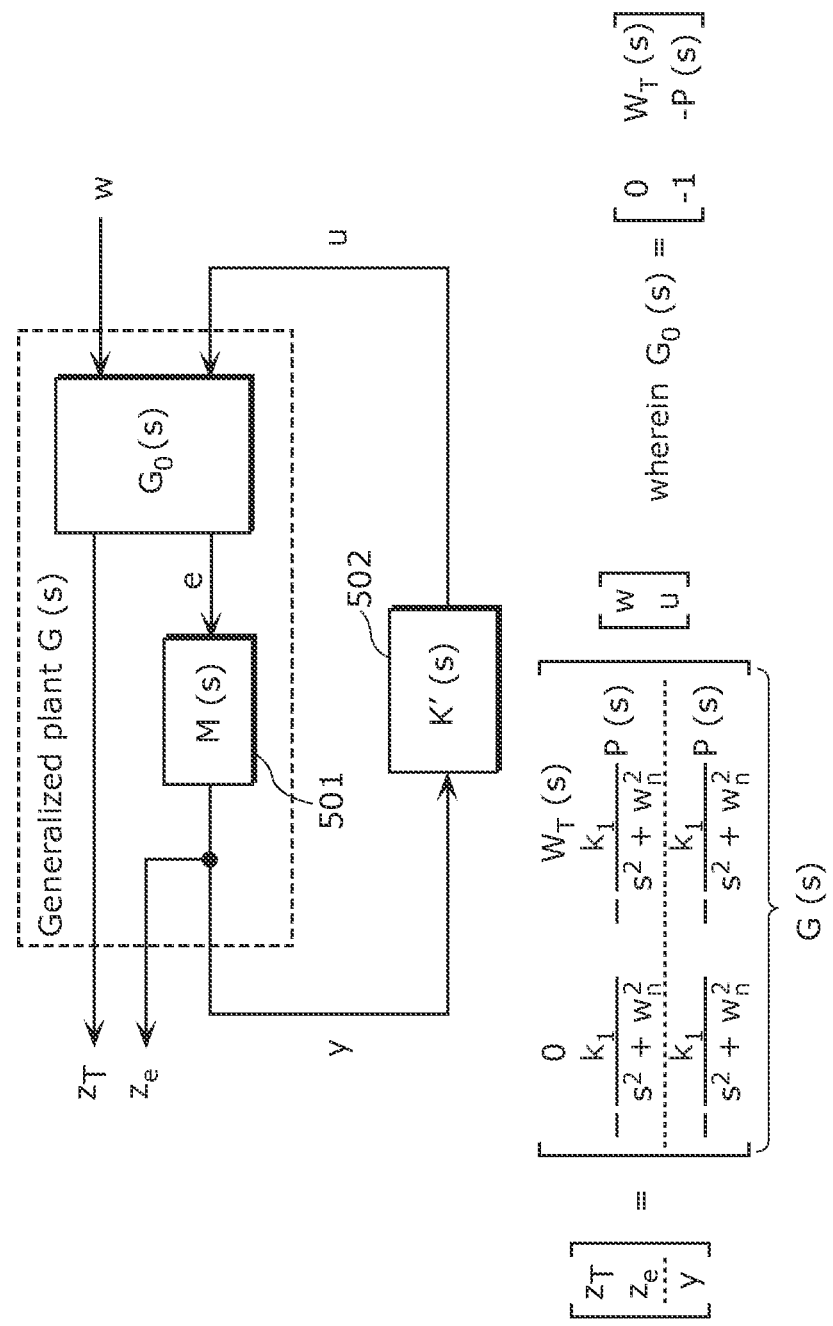
FIG. 12 is a block diagram obtained by performing equivalent conversion on the block diagram illustrated in FIG. 6, using a generalized plant G (s).

For example, a model illustrated in FIG. 6 can be represented as in FIG. 12 by performing equivalent transform using the generalized plant G (s). At this time, it is possible to calculate K' (s) in suboptimal solution by solving the H∞control problem represented by Expression (16) below so as to reduce the H∞norm from a disturbance w to the amounts of control $Z_T$ and Ze at or below a predetermined value.

[Math. 16]

$$\|G(s)K'(s)\|_\infty < 1 \qquad \text{Expression (16)}$$

Here, $\|G\|_\infty$ is defined by Expression (17).

[Math. 17]

$$\|G\|_\infty = \sup_\omega \sigma(Gzw(j\omega)) \qquad \text{Expression (17)}$$

Here, in Expression (17), σ(•) denotes a largest singular value.

The method for solving the H∞control problem described in detail in Non-patent Literature 1, and thus details thereof are not described here.

Based on the transfer function K' (s) of the partial controller 502 calculated in this way and a transfer function M (s) of the internal model 501, a model of the power controller 103 is calculated.

After the weighting function 504 is defined according to the characteristics of the control target system as described above, a transfer function K (s) of the power controller 103 calculated based on the partial controller 502 which is the earlier described H∞controller and the internal model 501 are calculated as a transfer function for continuous time duration. The transfer function K (s) calculated in this way is transformed into a transfer function in discrete time by 50 [μ sec] at a sampling cycle Ts, and is then transformed into state spatial representations as represented as Expressions (2) and (3).

In Expression (2), x [n] is an internal state represented as an N-dimensional column vector in Step n. In addition, e [n] is a feedback input to be input to the power controller 103 in Step n. More specifically, e [n] is an input representing an error between a voltage reference value and an output value by the power supply device 101.

In Expression (3), u [n] is an output by the power controller 103 in Step u [n]. In addition, $A_K$, $B_K$, and $C_K$ are coefficient matrices in a state space equation. More specifically, $A_K$, $B_K$, and $C_K$ are values calculated as shown in the above Non-patent Literature 1 or the like.

Figure 13:
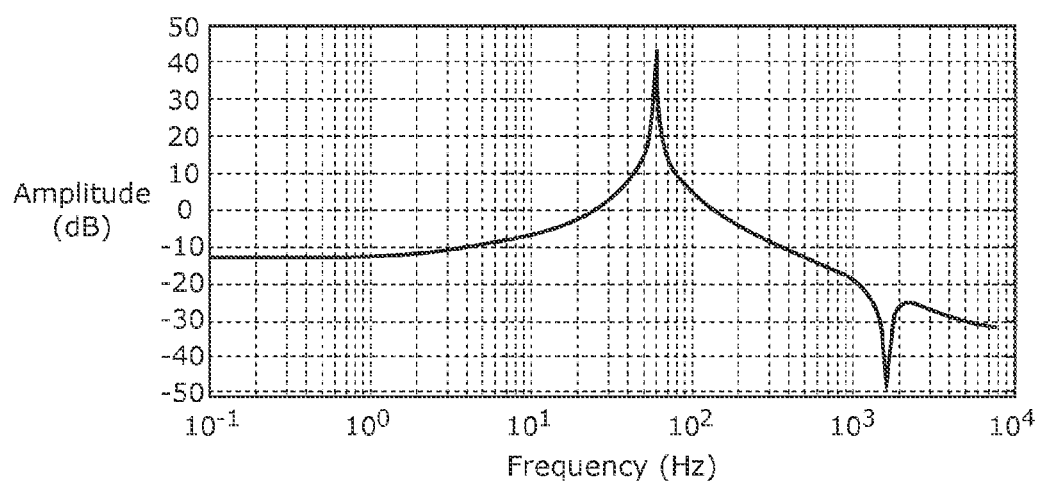
FIG. 13 is a Gain diagram of the power controller according to the embodiment.

FIG. 13 illustrates a Gain diagram of the power controller 103 which is the H∞controller designed using the designing method according to this embodiment. The Gain diagram is a diagram in which the horizontal axis represents logarithm frequency and the vertical axis represents the amount of logarithm [dB] of an amplitude ratio (gain) between input and output.

As shown in FIG. 13, the power controller 103 has a high gain in a frequency (60 Hz in this embodiment) of a voltage reference value. In other words, the gain frequency characteristics of the power controller 103 shows an upward convex in the frequency band of the voltage reference value such that the gain of the power controller 103 takes the local maximum value at the frequency of the voltage reference value. Here, the local maximum value means a locally maximum value in the frequency band of the voltage reference value. In this way, it is possible to represent a high trackability performance to an instruction value (voltage reference value) which is one of characteristics of the power controller 103.

In addition, the power controller 103 has a robustness to a load change when gains other than 60 Hz are suppressed. More specifically, as a characteristic, a gain is at or below 0 in a frequency band in which the impedances of the distribution line connected to the output of the power controller 103 and the load device 108 change.

In addition, the gain frequency characteristic of the power controller 103 shows a downward convex around 1000 Hz such that the gain of the power controller 103 takes a local minimum value at a resonant frequency of the LC filter. Here, the local minimum value means a locally minimum value at a frequency band of 1000 Hz. In addition, the gain around 1000 Hz of the power controller 103 is at or below 0. In this way, reducing the gain around 1000 Hz provides an advantageous effect of suppressing resonance of the LC filter.

Figure 14:
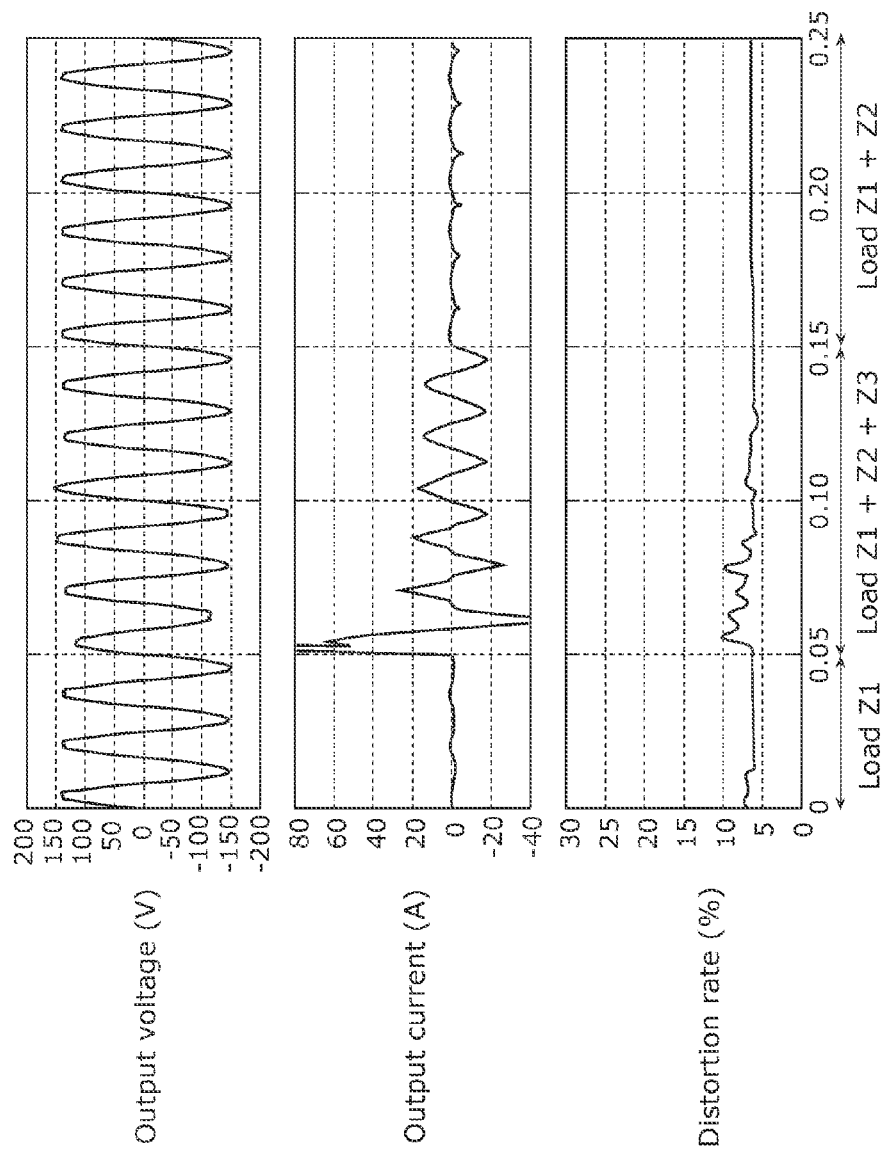
FIG. 14 is a diagram illustrating a result of simulation of output by the power control device including the power controller according to the embodiment.

Next, FIG. 14 illustrates a simulation result for output by the power controlling device having the power controller 103 designed as in this embodiment. In the diagram, the upper, middle, and lower graphs respectively represent temporal changes in voltage, current, and the distortion rate of output voltage. In FIG. 14, as for the already described three kinds of loads Z1, Z2, and Z3, only the load Z1 is ON from 0 to 0.05 second, all of the loads are ON from 0.05 to 0.15 second, and only the loads Z1 and Z2 are ON from 0.15 to 0.25 second.

In FIG. 14, the voltage approximately tracks an instruction value while the current value and the current waveform significantly change depending on how the loads are combined. More specifically, the voltage changes within approximately 10% or slightly above even when the distortion rate and current described in FIG. 5 changes most significantly. In other words, FIG. 14 indicates that the power controller 103 has a high robustness to a load change.

In this embodiment, the storage battery 105 is used as a direct current power source. In addition to this, various kinds of power sources such as a photovoltaic power generating device and a wind power generating device are also conceivable. In addition, the direct current power source does not need to be present inside the power supply device 101, and may be connected through a direct current bus line from outside.

As clear from the descriptions above, the power controller according to this embodiment is designed based on the H∞control theory with reference to the load change range, and has an internal model for a voltage reference value which is desired to be tracked based on the internal model principle.

The power control device using the power controller has an increased load trackability even when it is impossible to accurately identify the impedances of the distribution line and load to be connected. Thus, the power control device is capable of outputting a stable voltage that is robust to load changes and thus has little distortion. In other words, the use of the method for designing a power controller according to the present invention makes it possible to realize the power control device capable of operating load devices stably.

Although the present invention has been described based on the above embodiment, the present invention is not limited to the above embodiment as a matter of course. The following cases are also included in the present invention.

(1) Each of the device can be implemented specifically as a computer system including a microprocessor, a ROM, a RAM, a hard disk unit, a display unit, a keyboard, a mouse, and so on. A computer program is stored in the RAM or hard disk unit. Each of the devices achieves its functions through the microprocessor's operations according to the computer program. Here, in order to achieve predetermined functions, the computer program is configured by combining plural instruction codes indicating instructions for the computer.

(2) A part or all of the structural elements of the device may be configured with a single system-LSI (Large-Scale Integration). The system-LSI is a super-multi-function LSI manufactured by integrating structural units on a single chip, and is specifically a computer system configured to include a microprocessor, a ROM, a RAM, and so on. A computer program is stored in the ROM. The system-LSI achieves its function through the microprocessor's loading the computer program from the ROM to the RAM and performing operations etc. according to the computer program.

(3) A part or all of the elements constituting the devices may be configured as an IC card which can be attached to and detached from the respective devices or as a stand-alone module. The IC card or the module is a computer system configured from a microprocessor, a ROM, a RAM, and so on. The IC card or the module may include the above-described super-multifunctional LSI. The IC card or the module achieves its functions through the microprocessor's operations according to the computer program. The IC card or the module may also be tamper-resistant.

(4) The present invention may be realized as the above-described methods. In addition, any of the methods may be implemented as computer programs for executing the above-described method, using a computer, and may also be implemented as digital signals including the computer programs.

Furthermore, the present invention may also be implemented as computer programs or digital signals recorded on computer-readable recording media such as a flexible disc, a hard disk, a CD-ROM, an MO, a DVD, a DVD-ROM, a DVD-RAM, a BD (Blu-ray Disc), and a semiconductor memory. Furthermore, the present invention may also be implemented as the digital signals recorded on these recording media.

Furthermore, the present invention may also be implemented as the aforementioned computer programs or digital signals transmitted via a telecommunication line, a wireless or wired communication line, a network represented by the Internet, a data broadcast, and so on.

The present invention may also be implemented as a computer system including a microprocessor and a memory, in which the memory stores the aforementioned computer program and the microprocessor operates according to the computer program.

Furthermore, it is also possible to execute another independent computer system by transmitting the programs or the digital signals recorded on the aforementioned recording media, or by transmitting the programs or digital signals via the aforementioned network and the like.

(5) The embodiments and variations thereof may be arbitrarily combined.

When the present invention is implemented as software, the functional elements of the present invention can naturally be executed by the program(s) being executed using hardware resources of the computer such as a CPU, a memory, an input and output circuit, etc. In other words, the functions of the various kinds of processing units are realized by means of the CPU reading (extracting) processing target data from the memory or the input and output circuit and performing operations, temporarily storing (outputting) the operation results into the memory or the input and output circuit, and the like.

Furthermore, when the present invention is implemented as hardware, the present invention may be implemented as a single-chip semiconductor circuit, as a single circuit board on which a plurality of semiconductor chips are mounted, as a single device having an enclosure in which all of the elements are housed, or by means of linking operations by a plurality of devices connected through a transmission path. For example, the present invention may be realized using a server-client system by providing the storage unit in the embodiment to a server device and providing the processing units in the embodiment to a client device which wirelessly communicates with the server device.

It is to be noted that the present invention is not limited to the embodiments and variations thereof. The present invention includes various kinds of modifications that would be conceived by any person skilled in the art and made to the embodiments and variations thereof and other embodiments that would be configured by any person skilled in the art by combining the structural elements in different embodiments and variations thereof, without deviating from the scope of the present invention.

INDUSTRIAL APPLICABILITY

The present invention is applicable as methods for designing power controllers, and power controllers designed according to the present invention, and power control devices including the power controllers are applicable to controllers for inverters which convert direct-current power to alternating-current power and output the alternating-current power.

REFERENCE SIGNS LIST

101 Power supply device
102 Power control device
103 Power controller
104 Inverter
105 Storage battery
106 Voltage/current sensor
107 Distribution switchboard/Power switchboard
108 Load device
201 Filter
301 Operating unit
302 Matrix storage unit
303 State storage unit
501 Internal model (transfer function of an internal model)
502 Partial controller (transfer function of a partial controller)
503 Control target
504 weighting function
601 Inverter block
602 Filter block
603 Load device block
1501 Voltage change compensating block

The invention claimed is:

1. A power control apparatus comprising:
an inverter; and
a power controller which (i) receives, as an input, a difference between a voltage reference value and an output voltage value output from a control target including the inverter, and (ii) outputs, to the control target, a control output for conforming the output voltage value to the voltage reference value,
wherein the power controller includes:
- a matrix storage unit configured to store a coefficient matrix for representing, as a state space, a transfer function for the power controller determined by calculating a product of (i) a transfer function of an internal model obtainable by performing a Laplace transform on the voltage reference value and (ii) a transfer function of a partial controller, the transfer function of the partial controller being for outputting the control output after receiving, as an input, an output of the transfer function of the internal model;
- a state storage unit for storing a vector representing an internal state in the state space; and
- an operating unit configured to calculate the control output based on a difference between the voltage reference value and the output voltage value, the vector representing the internal state stored in the state storage unit, and the coefficient matrix, and
wherein the transfer function of the partial controller is determined using an H∞ control theory, so as to reduce (i) a first amount of control obtainable by multiplying the control output and a weighting function based on an amount of change in impedance of the control target and (ii) a second amount of control that is an output of the transfer function of the internal model.

2. The power control apparatus according to claim 1,
wherein the voltage reference value is represented as a sin function, and
wherein the transfer function of the internal model is obtainable by performing Laplace transform on the sin function.

3. The power control apparatus according to claim 1,
wherein the control target includes at least one of a filter, a distribution line, or a load device connected to an output of the inverter.

4. The power control apparatus according to claim 1,
wherein the amount of change in the impedance of the control target is a difference between a minimum impedance conceivable for the control target and a maximum impedance conceivable for the control target.

5. The power control apparatus according to claim 1,
wherein the control target includes a filter, a distribution line, and a load device which are connected to an output of the inverter, and
wherein when impedances of the filter and the distribution line which are connected to the output of the inverter are determined to be nominal models, the amount of change in the impedance of the control target is a difference between a combined impedance of the nominal models and a maximum combined impedance of the filter, the distribution line, and the load device which are connected to the output of the inverter.

6. The power control apparatus according to claim 1,
wherein the power controller has gain frequency characteristics including:
- a gain shown in an upward convex in a graph in a frequency band of the voltage reference value; and
- a gain at or below 0 decibel in a frequency band in which impedances of the distribution line and the load device connected to the power controller change.

7. The power control apparatus according to claim 1,
wherein the power controller has gain frequency characteristics that a gain is at or below 0 decibel and is shown as a downward convex in a resonant frequency band of an LC filter included in the control target.

* * * * *